United States Patent [19]

Gardner

[11] Patent Number: 4,646,455
[45] Date of Patent: Mar. 3, 1987

[54] ANIMAL IDENTIFICATION TAG

[76] Inventor: Michael S. Gardner, 108 Waiatarua Road, Remuera, Auckland, New Zealand

[21] Appl. No.: 773,379

[22] Filed: Sep. 6, 1985

[30] Foreign Application Priority Data

Nov. 26, 1984 [NZ] New Zealand .................. 210322

[51] Int. Cl.$^4$ ............................................. G09F 3/00
[52] U.S. Cl. ........................................ 40/301; 40/300
[58] Field of Search ..................... 40/301, 300, 302; 119/156, 96

[56] References Cited

U.S. PATENT DOCUMENTS

| | | | |
|---|---|---|---|
| 2,078,827 | 4/1937 | Ashton | 40/301 |
| 3,512,289 | 5/1970 | Hayes | 40/301 |
| 3,934,368 | 1/1976 | Fearing | 40/301 |
| 4,010,563 | 3/1977 | Schwindt | 40/301 |
| 4,359,015 | 11/1982 | Ritchey | 40/301 |
| 4,425,726 | 1/1984 | Duorak | 40/301 |
| 4,471,546 | 9/1984 | Bolling, Jr. | 40/301 |

FOREIGN PATENT DOCUMENTS

2322855  11/1973  Fed. Rep. of Germany ........ 40/301

Primary Examiner—Gene Mancene
Assistant Examiner—J. Hakomaki
Attorney, Agent, or Firm—Ladas & Parry

[57] ABSTRACT

This invention relates to an animal identification tag and in particular to tags such as ear tags for use with animals. The identification tag includes one or more components, at least one of which is adapted to engage with the skin of an animal so as to engage an identification portion with and relative to, the animal. One or more holes or slots are formed or provided in and passing through, at least one of the components; which component will, in use, be positioned or located over and adjacent a cut or slit formed in the skin of the animal, so as to allow for location of the identification tag. The arrangement of the invention is such that the one or more holes or slots are provided in said tag, so that air and/or light have access to the cut or slit formed in the skin of the animal.

13 Claims, 4 Drawing Figures

ANIMAL IDENTIFICATION TAG

BACKGROUND TO THE INVENTION

This invention relates to animal identification means and in particular to animal identification means in the form of ear tags for use with such animals as for example, sheep, cattle, goats and the like. These are however by way of example only.

Up until this time numerous forms of identification tags have been provided, all of which involve the forming of a cut or slit in the ear of an animal so that at least part of an identification means can pass therethrough, so as to locate the identification means in a predetermined or desired position; preferably relative to the ear of an animal. The cut or slit is usually formed in the ear by means of an applicator tool which can for example by a unitary tool having a shaft with a sharpened end, provided with means such as lugs, so that at least part of an identification means is attached thereto, the sharpened end and shaft thereafter being pushed or passed through the ear of an animal, forming a cut or slit in the ear, and at the same time passing at least part of the identification means through the ear so that the identification means is located in position relative thereto. In other forms, applicator tools are provided which have jaws which are pivotally movable relative to each other. An applicator pin, shaft or blade extends downwardly from for example an upper jaw. At least one component part of an identification means can be attached to or mounted on the pin, shaft or blade, and the jaws located about the ear of an animal. The jaws are then brought together, so that the pin, shaft or blade, (with the identification means mounted thereon, or attached thereto) passes through the ear of the animal to attach and mount the identification means. As with the previous arrangement referred to, the passage of the pin, shaft or blade (and the tag attached thereto or mounted thereon), causes a cut or slit in the ear of the animal.

The cut or slit formed in the ear of the animal usually causes bleeding and thus presents an open wound, which must heal. In the case of animals, the wound is often subject to infection such as by brushing against other animals, by brushing against the ground, or by general infection. If the wound does not heal, in a relatively short period of time, the wound will become infected and this will effectively rot or eat away the skin and flesh around the ear, this being particularly unpleasant and disadvantageous. Not only is the infection irritating for the animal, but the infection, if it eats away at the flesh and skin surrounding the wound, will enlarge the cut or slit to such an extent that in some cases, the identification means will be more easily removed or pulled from the animal, this detracting from the purpose and efficiency of animal identification means.

In a large number of ear tags used up until this time, the tags include one or more components which, on being passed through the ear of an animal, or on being connected one to the other relative to a cut or slit that has been formed in the ear of an animal, then sit over or substantially cover the wound formed by the cut or slit. Thus, the wound, cut or slit is usually substantially or at least partially covered, over or adjacent the wound, cut or slit in the ear of an animal, so that air and light do not have ready access to the wound. As will be appreciated, if air and light have access to a wound caused by a cut or slit, the air and light will assist in the healing process. If however, the wound is at least partially covered by a component of an identification means, extending or passing thereover, access to air and light is restricted (and in some cases minimised), so that there is no assistance from air and light in the healing process. Indeed, in some cases where components rest against the ear of the animal and over the wound, the component rubbing, moving or sitting against the wound will tend to irritate the wound further and perhaps increase the risk of infection. Particularly this is the case in countries with particularly high temperatures or humidity, where it is important for a wound formed by the cut or slit to have access to air and light.

None of the identification means used up until this time have attempted to provide an effective means of overcoming this problem.

For example, U.S. Pat. No. 3,731,414 (re-issued as U.S. Pat. No. Re. 31,632), to Murphy et al, discloses a well known ear tag arrangement which involves two components, one component having an elongate hollow shank extending outwardly therefrom and the other component having a hole or boss therein. The arrangement is such that the shank is pushed through the ear of an animal (thus causing a cut or slit in the ear) and engages in a boss in the other component. The component which has the shank extending outwardly therefrom, and which shank has caused the cut or slit (and thus the resultant wound in the ear), then at least partially covers and sits over the wound. At the same time, the second component also tends to rest against and cover that area of the ear at and/or immediately surrounding the cut or slit formed in the ear. In this particular case therefore, the component parts of a tag, which has been sold under the trade mark "ALLFLEX" (registered trade mark), substantially covers and passes over the cut or slit without providing any means for air and/or light to have access to the wound. Thus, this tag suffers from the problems outlined above.

A further arrangement is known and described in U.S. Pat. No. 3,552,051 to Ritchey. In this specification there is disclosed a one piece or unitary tag which has a main body portion, an elongate neck and a head attached to the end of the neck, the neck being bent at an angle relative to the main body portion, and the head being of a substantially arrow shape, having shoulders which extend outwardly from the sides of the neck, the shoulders then leading into bottom sides which extend inwardly towards each other so as to complete the head of the tag. The arrangement of U.S. Pat. No. 3,552,051 to Ritchey, is described as being located in the ear of an animal by being assocaited with a hand held applicator tool with a pointed end, which forces the folded head of the tag and at least part of the neck through a cut or slit formed by the pointed end of the applicator tool. The applicator tool is then withdrawn and the head of the tag unfolds, so that the outwardly extending shoulders and head prevent the tag from being withdrawn. In some forms of the arrangement however, and especially where the neck is bent or angled, upper or lower faces of the head will at least partially cover and be positioned over at least part of a wound, cut or slit formed in the ear by location of the tag. In this particular arrangement therefore, the cut or slit will again be at least partially covered by part of the ear tag, so that there will be very little, if any, access to air and light, in so far as the wound is concerned, this detracting from healing of the wound.

A further arrangement is described and disclosed in U.S. Pat. No. 3,958,353, to Hayes, this specification disclosing a two-piece "stand up" tag, which is provided with a first body portion having a section adapted to receive indicia, and a base, and a second portion having a base with a pin. The pin is passed through a cut or slit in the ear of the animal from one side thereof, and engaged with the first body portion, both portions of the tag then substantially surrounding and covering any wound resulting from the cut or slit formed in the ear, for location of the tag. Again, no means are provided for allowing air and/or light to have access to the wound.

It will be appreciated from the above, that there are substantial disadvantages with the identification means used up until this time, in that they do not attempt to provide any answer to the problem of how to allow air and/or light access to a cut, slit or wound resulting therefrom.

It is an object of this invention to go at least some way towards overcoming or at least minimising this problem.

Other objects of this invention will become apparent from the following description.

BRIEF SUMMARY OF THE INVENTION

According to one aspect of this invention there is provided an animal identification tag including one or more components and wherein one or more holes or slots are formed or provided in and through at least one said component, which component will, in use, be positioned or located so as to at least partially cover and/or be positioned over a cut or slit formed to allow location of said identification means, the arrangement being such that said one or more holes or slots are so positioned relative to said cut or slit that air and light pass therethrough and reach said cut or slit, such as to prevent or inhibit infection associated therewith.

According to a further aspect of this invention, there is provided an animal identification tag including a main body portion adapted to receive indicia; an elongate neck extending outwardly therefrom and having a head portion at its outer end; the head portion being formed or provided with one or more holes or slots therein and which are spaced apart from a connection between the main body portion and the neck; the arrangement being such that on said head portion and neck being passed through a cut or slit in animal skin, such as to retain said identification tag in position relative to said skin; said one or more holes or slots in said head portion are positioned over and/or adjacent said cut or slit, so as to allow air and/or light to have access to said cut or slit.

According to a further aspect of this invention, there is provided an animal identification tag including at least two components; a first component including an elongate shank extending outwardly therefrom; and a second component being formed with a bore or hole adapted to receive at least an end of the shank; the arrangement being such that the first and second components are engageable one with the other, the elongate shank being adapted to pass through a cut or slit in animal skin and to thereafter pass through and engage with said second component; such engagement retaining the identification tag and position relative to said animal skin; one or more holes or slots being formed or provided in and through at least one of said first and second components; said one or more holes or slots being spaced apart from a join between said first component and said shank and/or said bore of said second component, the arrangement being such that in use, and on engagement of said first and second components, said one or more holes or slots are positioned over or adjacent said cut or slit, such as to allow air and/or light to have access to said cut or slit.

BRIEF DESCRIPTION OF THE ACCOMPANYING DRAWINGS

This invention will now be described by way of example only, and with reference to the accompanying drawings, wherein.

DETAILED DESCRIPTION OF THE PREFERRED EMBODIMENT

The invention will now be described by way of example only, but it should be a-preciated that the invention is described by way of example, with reference to ear tags for identifying and marking animals such as sheep, cattle goats, camels and the like. This is by way of example only however, and the identification means can be used for any appropriate animal. If desired, the identification means can be used for attachment to some part of the body of an animal other than an ear. The identification means of the present invention is preferably formed of an appropriate material; for example a plastics material. This is by way of example only however.

Throughout the specification and claims, reference is made to the term "holes or slots" as formed or provided in at least one component of an identification means, such as an animal ear tag. It should be appreciated that this term covers any one or more holes or slots of any shape, configuration and size, the requirement being that any one or more such holes or slots will be of such shape(s), configuration(s) and size(s), as to be provided and located within that area of the said at least one component, as defined by the sides thereof.

The disadvantages of the arrangement used up until this time, have been referred to and described hereinbefore.

The present invention therefore sets out to overcome or at least minimise the problems associated with ear tags used up until this time, by providing a means whereby air and/or light are able to obtain at least limited access to a cut or slit that is formed in the ear of an animal, or to a wound resulting therefrom, during location of an ear tag. As referred to hereinbefore, the applicator tool used for applying an ear tag to the ear of an animal, such as a "push through" type applicator or a "pliers type" applicator incorporates means in the form of a pointed end, a pin, shaft or blade, which passes through the ear to locate the remainder of the tag in position. This cut or slit often forms a wound and it is therefore important that means be provided whereby an amount of air and/or light has access to the cut, slit, or wound, or at least to an area adjacent thereto.

Figure 1:
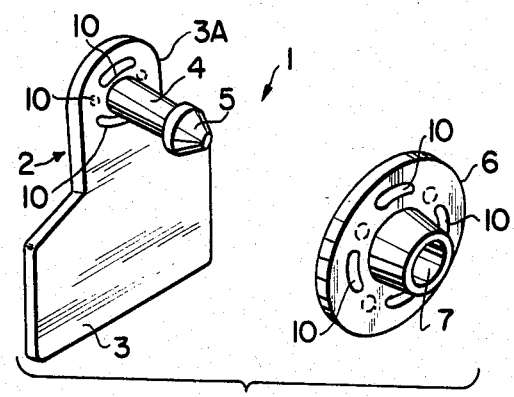
FIG. 1 is an arrangement according to one form of the present invention.

Referring to FIG. 1 of the accompanying drawings, this shows one form of the invention where the ear tag 1 has two components, being a first component 2 having a main body portion 3, capable of receiving indicia, and from which an elongate shank 4 extends outwardly. The shank 4 preferably has a pointed or sharpened end 5. The second component is a securing tab 6, which has a hole or boss 7 therein so that on the shank 4 of the first component 2 passing through the ear of an animal (such as on a cut or slit being formed by an applicator member), an end 5 of the shank 4 will move into and be engaged within the hole or boss 7 so as to engage the two components 2 and 6 one with the other, and in particular so as to retain the first component 2 and the main body portion 3 thereof in position relative to the ear. In use the area adjacent and about the upper body portion 3a and its connection to the shank 4, is positioned over or substantially covers a cut or slit (and any wound resulting therefrom), formed in an ear for location of said tag. Likewise, an inner surface of the tab 6 may tend to rub against or at least partially cover and pass over the cut or slit on the other side of an ear. Thus, at least the first component 2 is provided with a plurality of spaced apart holes or slots 10 which extend through the component immediately over and about the cut or slit, so that air and/or light will have access to the cut or slit. The holes or slots 10 can be of any configuration and number, and can be of any size and diameter. If desired, they can merely be a plurality of juxtaposed pin holes, passing through the component so that they provide a plurality of holes or bores which give air and/or light access to or about the cut or slit underneath the component.

In an alternative form of the invention, one or more slots can be provided such as in that area of the component that will be immediately over or adjacent the cut or slit, so that air and/or light has access thereto.

In one form of the invention, involving substantially round or circular components, substantially curved or arcuate slots can be provided such as shown, thus giving air and/or light access to the cut or slit. As an alternative or in addition thereto, a plurality of holes can be provided passing through a component.

If desired, one or more such holes or slots 10 can be formed or provided in both components 2 and 6.

Figure 2:
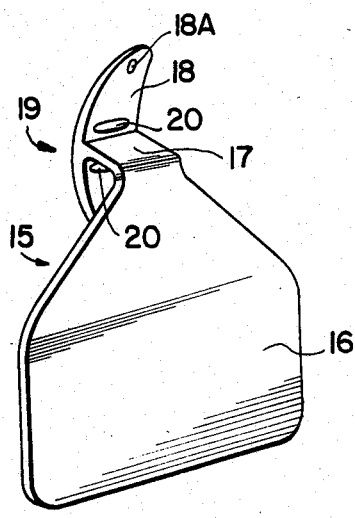
FIG. 2 is an arrangement according to a further form of the present invention.

Referring to FIG. 2 of the accompanying drawings, a tag 15 is disclosed which is readily available in some countries, and which has a main body portion 16 and an outwardly extending neck 17, an elongate head portion 18 being formed which is, in one preferred arrangement, about the same width as the width of the neck 17. Such arrangements are provided with holes 18a in one or more ends of the elongate head 18, for attachment to lugs of insertion tools and applicators, so that the neck 17 and head 18 are generally brought together and passed through a cut or slit formed in the ear of an animal, the arrangement being such that on the tool being removed, the head 18 will extend outwardly from the neck 17, so as to form a substantially "T" bar arrangement, this preventing or withdrawal of the tag from the ear. It will be appreciated there is a substantial "T" connection 19, between the neck 17 and head 18, which will tend to at least partially cover and pass over any cut or slit formed in the ear of the animal. In this particular form of the ear tag therefore, one or more holes or slots 20 are formed in the head portion 18, and in particular in that portion of the head which will be over and adjacent any cut or slit formed in the ear of the animal. In this way therefore, air and/or light will have access to the cut or slit.

Figure 3:
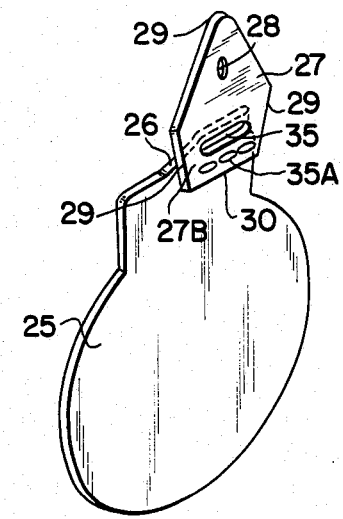
FIG. 3 is an arrangement according to yet a further form of the present invention.
Figure 4:
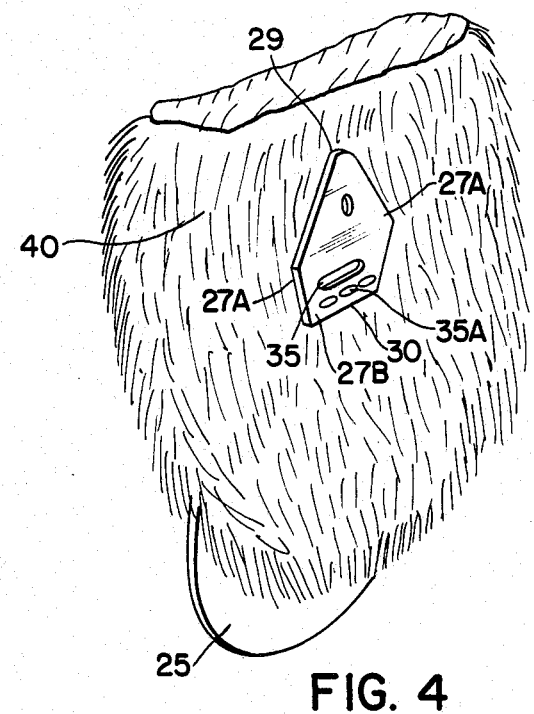
FIG. 4 is an arrangement according to one form of the present invention, showing a tag engaged in an animal's ear.

We refer now to a further form of the invention as shown in FIGS. 3 and 4 of the accompanying drawings.

In this arrangement, a main body portion 25 is provided which is adapted to receive marking or indicia. An elongate neck 26 extends outwardly from the main body 25 portion and a head 27 is provided at one end thereof. The neck 26 is angled or stepped downwardly and the head 27 is attached to or formed with the outer end of the neck 26, so that it is substantially in the same plane as but spaced apart from and below, the main body portion 25. Holes, such as 28, may be provided for engagement with lugs of an applicator tool. In use, an applicator tool is used to pass the head 27 and at least part of the neck 26 through a cut or slit in the ear of an animal, the tool then being removed and the head 27 extending outwardly from the sides of the neck 26, preventing withdrawal of the tag from the ear. In order to pass the head 27 of the tag through the ear of the animal, the sides 27a thereof are required to be at least semi flexible, so that they will curve or fold inwardly towards each other, the arrangement being such that after their passage through the cut or slit in the ear, they will, due to their flexibility, return to their original form, in which they extend outwardly of the neck, thus retaining the tag in position within the ear.

The head 27, as will be appreciated from FIGS. 3 and 4 of the accompanying drawings, has a substantially pointed or sharpened forward end 29, sides 27 thereafter extending downwardly and inwardly towards each other, to terminate in a lower edge 30 which is substantially transverse to the longitudinal axis of the neck and body portion.

It will be appreciated therefore, that when the tag is in position in the ear of an animal, (such as shown in FIG. 4 of the drawings), a face of the head 27 will be positioned against and over the ear of the animal, immediately surrounding a cut or slit formed in the ear, for location of said tag. Thus, one or more holes or slots 35 are provided in the head, and in particular in that area of the head which is immediately over and/or adjacent the cut or slit formed in the ear.

Referring in particular to FIGS. 3 and 4 of the accompanying drawings, at least one slot 35 is formed in the lower portion 27b of the head 27, between its join to the neck 26 and the said lower edge portion 30.

The holes or slots can be in the form of a plurality of juxtaposed and spaced apart holes, or alternatively in a preferred form of the invention, and as shown in FIGS. 3 and 4 of the accompanying drawings, can be in the form of one or more elongate and substantially rectangular slots 35.

Thus, referring to FIG. 4 of the accompanying drawings, at least one elongate slot 35 is formed in the lower portion 27b of the head 27, so that air and/or light has good and ample access to a cut or slit formed in an ear 40 (and through which the head and neck have passed).

Preferably, the slot 35 is substantially elongate and it has been found that by providing such a slot 35 in the head 27 of a tag, such as that shown in FIG. 4 of the accompanying drawings, the flexibility of the head is enhanced to such an extent that it assists the sides 27a of the head 27 flexing in towards each other when the head 27 and neck 26 are passing through a slit or cut in the ear, during location of the tag.

As shown in FIGS. 3 and 4 of the drawings, holes 35a can be provided or formed in the head 27, either as an alternative, or in addition to, a slot 35.

It will be appreciated therefore that in the arrangement of FIG. 4 of the accompanying drawings, not only do one or more slots provide an effective means for allowing air and/or light access to the cut or slit, but said one or more slots also assist in location of the tag within the ear.

While the embodiment of FIGS. 3 and 4 of the drawings shows a slot 35, it should be appreciated that a plurality of such slots could be provided.

The one or more holes or slots can be formed or provided in at least one ear tag component, such as by moulding, cutting, forming or the like.

It is envisaged that in one form of the invention, a relevant part or portion of a tag component can be formed, moulded or the like with a section of thin mesh like plastics material. Thus, the holes in and forming the mesh will allow air and light access to and adjacent any cut, slit or wound resulting therefrom. Such a mesh-like area will also add some flexibility to the tag, as referred to herein by way of example.

It should be appreciated that the present invention has been described by way of example only, and that modifications and improvements may be made thereto without departing from the scope thereof, as defined by the appended claims.

I claim:

1. An animal identification tag including one or more components, and wherein one or more holes or slots are formed or provided in and passing through at least one said component, which component will, in use, be positioned or located so as to at least partially cover and/or be positioned over a cut or slit formed in animal skin, so as to allow location of said identification means; the arrangement being such that in use, and on location of said component relative to the skin of the animal, said one or more holes or slots are so positioned relative to said cut or slit, that air and light pass therethrough and reach said cut or slit, such as to prevent or inhibit infection associated therewith.

2. An animal identification tag as claimed in claim 1, including first and second components, a first component having an elongate shank extending outwardly therefrom and a second component being formed with a bore or hole adapted to receive at least an end of the shank, such that the first and second components are engageable one with the other; the elongate shank being adapted to pass through a cut or slit in said animal prior to engagement of said first and second components; one or more holes or slots being provided in and passing through at least said first component; said one or more holes or slots being spaced apart from said shank.

3. An animal identification tag as claimed in claim 1, including a main body portion adapted to receive indicia; an elongate neck extending outwardly therefrom and having a head portion attached to its outer end; the head portion being elongate in formation and extending outwardly at an angle from the longitudinal axes of said neck and said body portion and on either side thereof; said head and at least part of said neck being adapted in use to be passed through a cut or slit, so as to locate the main body portion in position; one or more holes or slots being provided in and passing through said head portion, at or adjacent its connection to said neck.

4. An animal identification tag as claimed in claim 1, including a main body portion adapted to receive indicia and an elongate neck extending outwardly from one end thereof; a head portion being provided at the other end of said neck and at least part thereof being wider than said neck; the head and at least part of said neck being adapted in use to be passed through a cut or slit; one or more holes or slots being formed in and passing through the head portion, at or adjacent its connection to said neck.

5. An animal identification tag as claimed in claim 1, including a main body portion and an elongate neck extending outwardly therefrom; a head being provided at a distal end of the neck; one or more holes or slots being formed in and passing through said head.

6. An animal identification tag as claimed in claim 1, including a main body portion; an elongate neck extending outwardly therefrom; a head portion being provided at a distal end of said neck; the head portion having a substantially pointed top end and thereafter having sides which extend downwardly to a lower end of said head portion; at least one hole or slot being provided in said head portion in a lower portion thereof, between the lower edge of said head portion and said neck.

7. An animal identification tag as claimed in claim 1, wherein said one or more holes or slots include one or more elongate slots passing through at least one of said components.

8. An animal identification tag as claimed in claim 1, wherein said one or more holes or slots are in the form of one or more arcuate slots passing through at least one of said components.

9. An animal identification tag as claimed in claim 1, wherein said one or more holes or slots are in the form of a plurality of juxtaposed holes passing through at least one of said components.

10. An animal identification tag as claimed in claim 1, in the form of an animal ear tag.

11. An animal identification tag as claimed in claim 1, wherein said one or more slots includes at least one elongate slot located substantially transverse to the longitudinal axis of said head.

12. An animal identification tag as claimed in claim 1, including a main body portion adapted to receive indicia; an elongate neck extending outwardly therefrom and having a head portion at its outer end; the head portion being formed or provided with said one or more holes or slots therein, and said one or more holes or slots being spaced apart from a connection between main body portion and the neck.

13. An animal identification tag as claimed in claim 1, including at least two components; a first component including an elongate shank extending outwardly therefrom and a second component being formed with a bore or hole adapted to receive at least an end of the shank; the arrangement being such that the first and second components are engageable one with the other, and the elongate shank being adapted to pass through a cut or slit in animal skin, and to thereafter pass through and engage with said second component; such engagement retaining the identification tag in position relative to said animal skin; said one or more holes or slots being formed or provided in and through at least one of said first and second components; said one or more holes or slots being spaced apart from a join between said first component and said shank and/or said bore of said second component.

* * * * *